D. KENDALL.
FORGING MANIPULATOR.
APPLICATION FILED MAR. 27, 1918.
1,308,593.
Patented July 1, 1919.
3 SHEETS—SHEET 3.
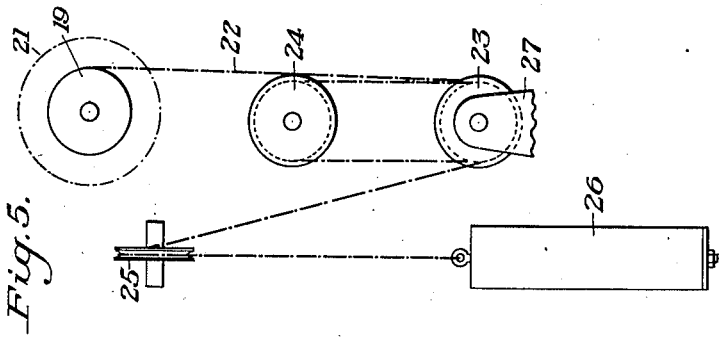
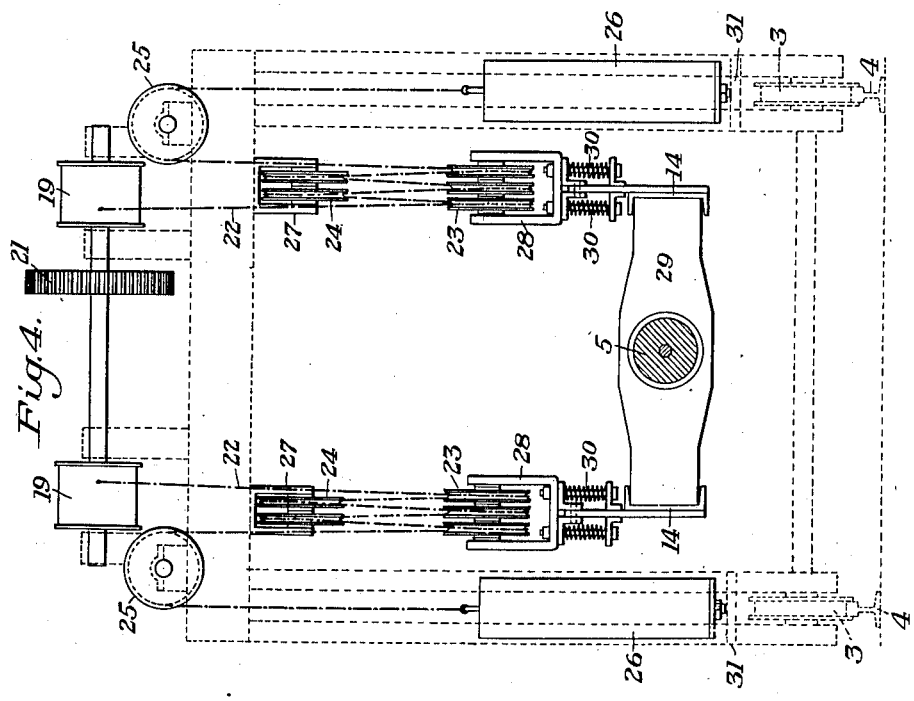
WITNESSES
INVENTOR

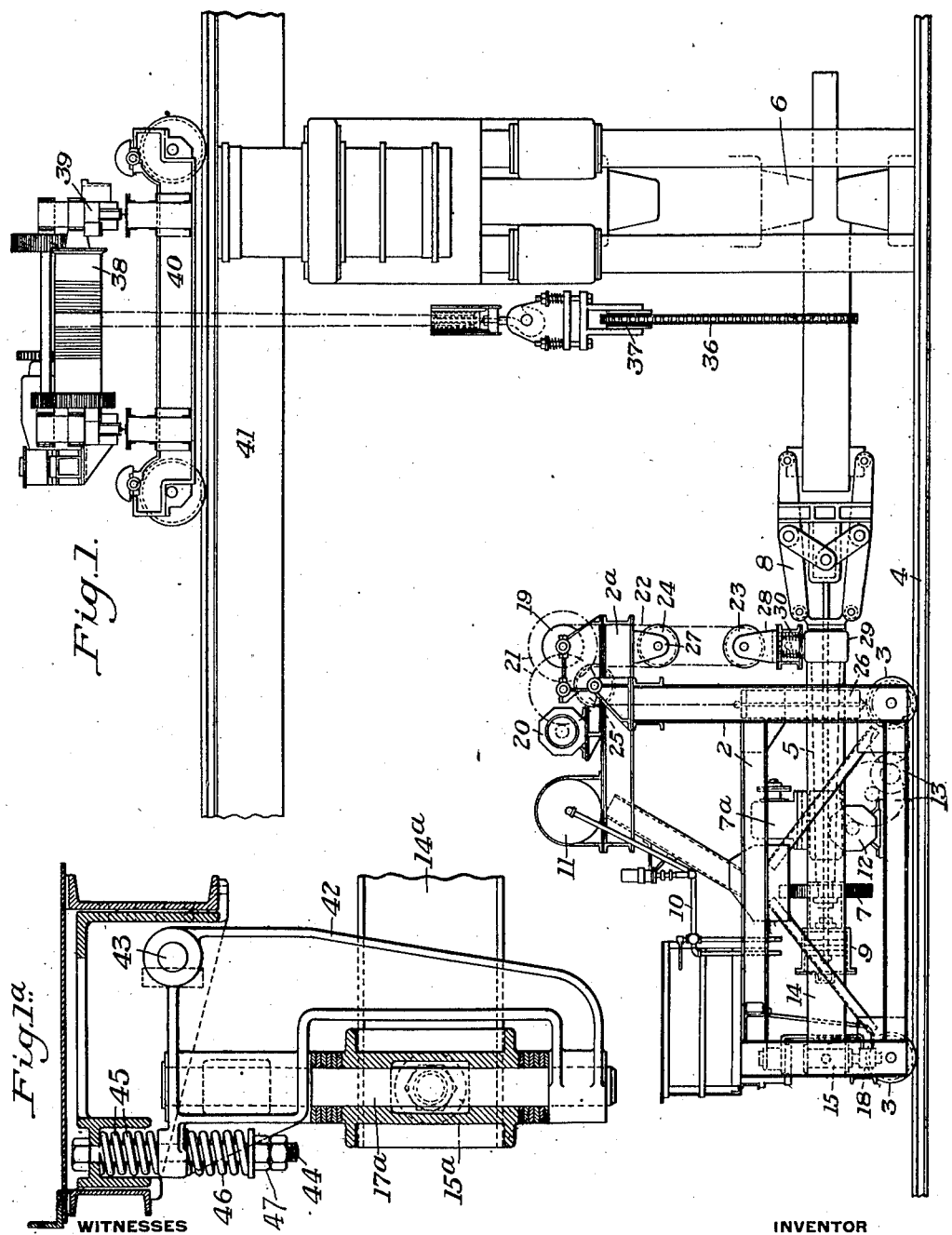

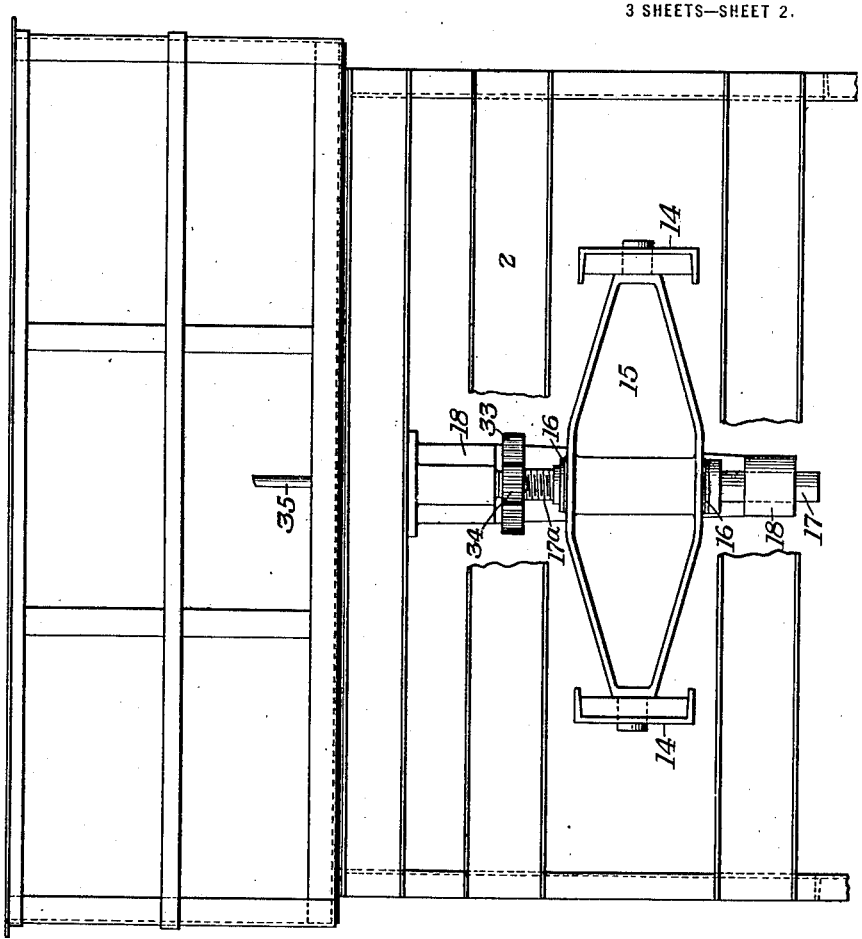

UNITED STATES PATENT OFFICE.

DAVID KENDALL, OF ALLIANCE, OHIO, ASSIGNOR TO THE ALLIANCE MACHINE COMPANY, OF ALLIANCE, OHIO, A CORPORATION OF OHIO.

FORGING-MANIPULATOR.

1,308,593.  Specification of Letters Patent.  Patented July 1, 1919.

Application filed March 27, 1918. Serial No. 225,024.

*To all whom it may concern:*

Be it known that I, DAVID KENDALL, a resident of Alliance, in the county of Stark and State of Ohio, have invented a new and useful Improvement in Forging-Manipulators, of which the following is a full, clear, and exact description, reference being had to the accompanying drawings, forming part of this specification, in which—

Figure 1 is a side elevation of a forging manipulator embodying my invention;

Fig. 1ª is a sectional detail view showing a modification of a portion of the mechanism;

Fig. 2 is a rear elevation of the same;

Fig. 3 is a detail sectional view;

Fig. 4 is a front elevation with the manipulator arm or peel in section; and

Fig. 5 is a diagrammatic view showing the manner in which the counterweights are connected.

My invention has relation to forging manipulators, and is designed to provide a manipulator which will combine desirable features of both the crane and floor types of manipulators.

A further object of the invention is to provide a manipulator in which the manipulator arm or peel is so mounted and arranged as to be universally controllable, and in which the reduction in the work piece during the forging operations will not materially change the angular position of the work piece. In its preferred form, however, I provide additional means by which a manipulator arm or peel may be bodily raised or lowered to maintain the work piece in level position, particularly in handling large ingots which have a large reduction in forging.

The nature of my invention will be best understood by reference to the accompanying drawings, in which I have shown the preferred embodiment thereof and which will now be described, it being premised, however, that various changes may be made in the details of construction and operation of the several parts, without departing from the spirit and scope of my invention as defined in the appended claims.

In these drawings, the numeral 2 designates a supporting frame which may be, in general, of any suitable character. This frame is shown as mounted upon wheels 3, arranged to travel on tracks 4, although the frame may be mounted in any other suitable way.

The numeral 5 designates the manipulator arm or peel which is arranged in a well known manner to grip and rotate an ingot and carry it to a press or hammer 6. 7 indicates any usual or suitable gearing driven by an electric motor 7ª, for rotating the grippers 8; and 9 is an air cylinder for opening and closing the grippers which are shown as being supplied with air by pipe connections 10 from an air reservoir 11, mounted on the upper portion of the frame 2. 12 designates a motor, by means of which the frame may be moved on the tracks 4, through suitable gearing 13.

In accordance with my invention, the manipulator arm or peel is pivoted near its extreme rear end in a manner to permit universal movement thereof. This may be accomplished in any suitable manner. In the drawings, I have shown the arm or peel as having the separated side channel members 14, in the rear end portions of which is trunnioned a bolster or bearer member 15, see Fig. 2, which is, in turn, sleeved for pivotal movement between the collars 16 of a vertical shaft 17, mounted in the upper and lower bearings 18 on the frame 2. In this manner, the peel has a free vertical movement on its trunnions and can swing in a horizontal plane on the shaft 17. The forward end portion of the peel is suspended from an overhead drum 19, journaled on the upward extension 2ª of the frame 2, and driven by an electric motor 20 through a suitable gearing 21. In the particular arrangement shown, this suspension is effected by two ropes or cables 22, each of which is connected at one end to the drum 19, and extends thence downwardly and around the two sets of sheaves or pulleys 23 and 24, the other end portion being thence carried upwardly over an idler 25, having a counterweight 26, attached to its free end. The upper sheaves or pulleys 24 are suitably mounted in brackets 27, on the frame portion 2ª, and the lower sheaves or pulleys 23 are journaled in yokes 28, which are connected to a cross member 29, of the peel through the spring bolts 30. The counterweights 26 normally rest upon suitable fixed shelves or supports 31, on the side portions of the frame 2. In the ordinary operations of raising and lowering the peel, these weights remain inactive, their total mass being properly proportioned with respect to the weight of the peel and of the work piece carried thereby. If, however, the forging for any reason is not in a level position on the anvil block of the hammer or press when the hammer or press comes down, these counterweights will automatically come into action to permit the peel with its work piece to yield downwardly to the necessary extent. In this manner, the counterweights act to automatically prevent undue strains on the peel and its suspension.

It will be noted that, by reason of the long radius of movement of the peel, the angular position of the work piece will change comparatively little during the forging operations, notwithstanding a considerable reduction therein. For ordinary sized ingots, therefore, the work piece will remain substantially level throughout the forging operation. In the case of large ingots, however, it is desirable to provide means whereby the peel may be adjusted to maintain the work piece level. This may be readily accomplished by making the horizontal pivotal axis of the peel adjustable in a vertical plane. For this purpose, I have shown the vertical pivot shaft 17, before referred to, as provided with a threaded portion 17ª at its upper end. This threaded portion is engaged by a revoluble nut 32, which is provided with gear teeth 33, engaged by the teeth of the pinion 34 on the shaft 35 (see Fig. 3). The shaft 35 may be actuated in any suitable manner, either by hand or power, to actuate the nut and thereby raise or lower the shaft 17, and thus effect the desired adjustment of the peel.

For long ingots or work pieces, I may provide a suitable additional support, such as indicated in Fig. 1. The additional support shown in this figure consists of a looped chain 36, running over a sheave 37, which is suitably suspended from the drum 38, mounted on a movable overhead trolley 39. This trolley is, in turn, shown as mounted on a carriage 40, which travels on the bridge 41.

In some cases, there is a tendency in elongating an ingot under a press to kick the machine backwardly to an extent approximately the length of the elongation. For this reason it may be desirable to hinge or pivot the bracket 42 in which the pivot shaft for the peel is journaled, as shown at 43 in Fig. 1ª. The upper rear corner of the bracket, as shown in this figure, slidingly engages a spring bolt 44, secured in the frame. An upper spring 45 is seated on this bolt between the bracket and the frame, and another spring 46 is seated between the bracket and the nuts 47 on the lower end of the bolt. This construction provides means for taking up a considerable portion of the kicking action referred to. Other parts shown in this figure are given reference characters similar to those applied to the corresponding parts in the other figures with the index "a". Any other suitable anti-kick device may, of course, be employed.

The advantages of my invention will be apparent. It provides manipulator mechanism having the flexible suspension of the overhead crane type manipulator, without, however, necessitating the use of an overhead crane. In this respect the manipulator has the advantages of manipulators of the floor type. Other advantages of the invention have heretofore been pointed out.

I do not herein broadly claim the feature of a counterbalance for manipulators of the general character and mode of operation described, since such device forms the subject matter of my copending application, Serial No. 178,636, filed July 5, 1917.

I claim:

1. A forging manipulator, comprising a movable support or carriage, a movable manipulator member pivoted thereto at a point near its rear end, and a flexible suspension engaging the manipulator member in front of its pivotal point, substantially as described.

2. A forging manipulator, comprising a movable supporting frame or carriage, a manipulator member universally pivoted to said support or carriage at a point near the rear end of said member, and a flexible suspension for the forward end portion of said member, substantially as described.

3. A forging manipulator, comprising a movable supporting frame or carriage, a manipulator member universally pivoted to said support or carriage at a point near the rear end of said member, and a flexible suspension for the forward end portion of said member, said suspension being carried by an upward extension of said support or carriage, substantially as described.

4. A forging manipulator, comprising a movable supporting frame or carriage, a manipulator member universally pivoted to said support or carriage at a point near the rear end of said member, and a flexible suspension for the forward end portion of said member, together with counterweight devices attached to said flexible suspension, said counterweight normally overbalancing the weight of the manipulator member under normal forging positions, but permitting it to automatically move downward under abnormal forging conditions, substantially as described.

5. A forging manipulator, comprising a movable support or carriage, a manipulator member pivoted to said support or carriage at a point near the rear end of said member, and means for effecting a vertical adjustment of the pivotal point of said member, substantially as described.

6. A forging manipulator, comprising a movable support or carriage, a long manipulator member universally pivoted thereto at a point near the rear end of said member, a flexible suspension supporting the forward end portion of said member, said suspension having counterweights arranged to normally overbalance the weight of the said member, but permitting the member to move downwardly under abnormal forging conditions, and means for vertically adjusting the horizontal pivotal axis of said member, substantially as described.

7. A forging manipulator, comprising a supporting frame, a manipulator member universally pivoted at its rear end portion in such supporting frame, an overhead drum mounted on an upward extension of said frame, suspension ropes or cables connected to said drum, and to opposite side portions of the manipulator member, and a series of sheaves or pulleys for each of the ropes or cables, substantially as described.

8. A forging manipulator, comprising a supporting frame, a manipulator member universally pivoted at its rear end portion in such supporting frame, an overhead drum mounted on an upward extension of said frame, suspension ropes or cables connected to said drum, and to opposite side portions of the manipulator member, and a series of sheaves or pulleys for each of the ropes or cables, together with a counterweight attached to the opposite end portion of each of said ropes or cables, and means for supporting said counterweights against downward movement, substantially as described.

9. Forging apparatus, comprising a supporting frame or carriage, a manipulator member pivoted at its rear end portion in said frame or carriage, a flexible suspension also mounted on said frame or carriage, and carrying the front end portion of the manipulator member, and an additional support for the work piece beyond the forward end of the manipulator member, substantially as described.

10. Forging apparatus, comprising a supporting frame or carriage, a manipulator member pivoted at its rear end portion in said frame or carriage, a flexible suspension also mounted on said frame or carriage and carrying the front end portion of the manipulator member, and an additional support for the work piece beyond the forward end of the manipulator member, said additional support being suspended from an overhead manipulator carriage or trolley, substantially as described.

11. A forging manipulator comprising a pivoted manipulator member, a flexible suspension engaging said manipulator member in front of its pivotal point, and an anti-kicking device arranged to coöperate with said member, substantially as described.

12. A forging manipulator comprising a movable supporting frame or carriage, a manipulator member universally pivoted to said support or carriage at a point near the rear end of said member, and an anti-kicking device arranged to coöperate with said member, substantially as described.

13. In a forging manipulator, the combination with a manipulator arm or peel, of a bracket in which the said arm or peel is universally pivoted, and a buffing or anti-kicking device coöperating with the said bracket, substantially as described.

In testimony whereof, I have hereunto set my hand.

DAVID KENDALL.